United States Patent [19]

Nash

[11] Patent Number: 5,040,614
[45] Date of Patent: Aug. 20, 1991

[54] SELF-OPERATED EDGING TOOL

[76] Inventor: Charles Nash, 301 Memorial Dr., Paris, Tenn. 38242

[21] Appl. No.: 612,988

[22] Filed: Nov. 15, 1990

[51] Int. Cl.5 .................................................. A01B 1/00
[52] U.S. Cl. ........................................ 172/18; 172/371; 30/277
[58] Field of Search .................... 172/13, 18, 371, 381, 172/611; 111/7.1, 99, 115; 30/277; 294/49, 57

[56] References Cited

U.S. PATENT DOCUMENTS

| | | | |
|---|---|---|---|
| 903,093 | 11/1908 | Howe | 30/277 X |
| 1,067,658 | 7/1913 | Joyce, Jr. | 30/277 X |
| 1,229,732 | 6/1917 | Erickson | 30/277 |
| 1,343,269 | 6/1920 | Lees | 172/18 |
| 1,665,109 | 4/1928 | Nelson | 30/277 |
| 2,485,877 | 10/1949 | Hamilton, Jr. | 111/99 X |
| 3,036,482 | 5/1962 | Kenworthy et al. | 30/277 X |

Primary Examiner—Dennis L. Taylor
Assistant Examiner—Jeffrey L. Thompson
Attorney, Agent, or Firm—Terry M. Gernstein

[57] ABSTRACT

An edging tool includes a sleeve unit in which a weight bar is slidably received and on which a blade is mounted. The weight bar is drawn back to a cocked position by hand, and when released, impacts an impact block mounted on the sleeve unit and which is in contact with the blade so impact from the weight bar drives the blade downwardly. The blade unit has a cutting edge which is positioned adjacent to an area to be edged. The movement of the weight bar with respect to the sleeve unit is controlled by various elements on the edging tool.

8 Claims, 3 Drawing Sheets

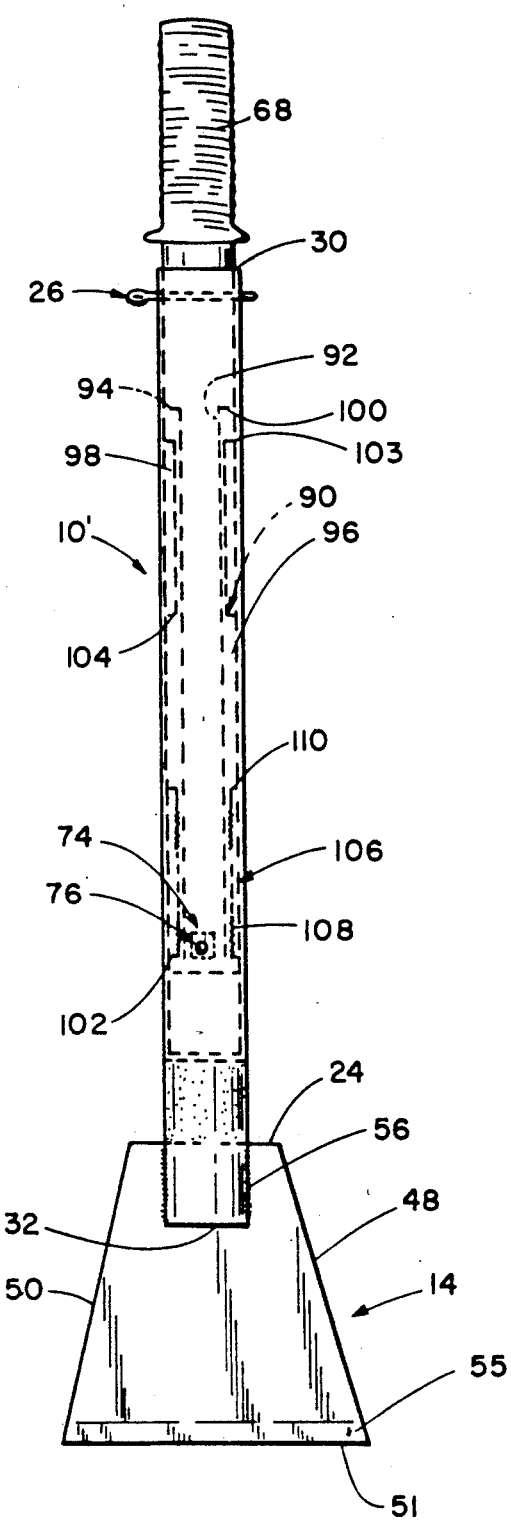
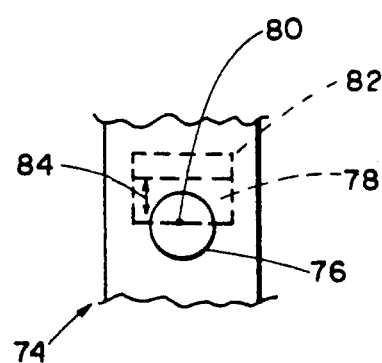
FIG. 4
FIG. 5

SELF-OPERATED EDGING TOOL

The present invention relates to the general art of agricultural implements, and to the particular field of digging instruments.

BACKGROUND OF THE INVENTION

Many homeowners have walkways and driveways that directly abut grassy areas of their property. The grass in such areas often grows over the edge of the walkway or driveway and presents an unsightly appearance. Not only are driveways and walkways susceptible to such aesthetic degradation, many otherwise pleasant gardens become overgrown at the edges by grass.

For this reason, many homeowners cut the grass away from such edges by a process known as edging. In an edging process, the grass is cut away in a groove around the perimeter of the area to be defined. This edging is usually done using a shovel or a spade. Sometimes edging is done using a trowel which requires the user to get down on his hands and knees.

The edging process can thus be so tedious and difficult that many people simply omit it from their gardening activities. Omitting an edging operation may detract from an otherwise pleasing appearance for a yard or garden. Even if the operation is carried out, many times the edge produced is ragged or simply not straight.

While the art does contain motorized edgers, such edgers may be expensive to purchase and difficult to maintain, as well as difficult and noisy to use. In fact, many of these motorized edgers should not be used by youngsters as there may be a danger in the use of such equipment.

Therefore, there is a need for an edger which is easy to use, inexpensive to purchase and maintain, yet is still capable of easily and safely producing a neat edge between a grassy area and an adjacent area.

OBJECTS OF THE INVENTION

It is a main object of the present invention to provide an edger which is self-operated so it is easy to use.

It is another object of the present invention to provide an edger which is inexpensive to purchase and maintain.

It is another object of the present invention to provide an edger which is inexpensive to purchase and maintain, yet is still capable of easily and safely producing a neat edge between a grassy area and an adjacent area.

It is another object of the present invention to provide an edger which can be adjusted to a particular operation.

SUMMARY OF THE INVENTION

These, and other, objects are achieved by an edging tool which includes a cutting blade on one end of a sleeve with an impact unit slidably contained in the sleeve. The cutting blade is separated from the impact element by an impact block so the blade will not be damaged during use of the tool.

The blade is positioned on the ground to be edged, the impact unit raised with respect to the blade, and released. Gravity pulls the impact tool into impact with the impact block thus imparting a sharp impact to the top of the cutting blade. This impact drives the blade down thereby cutting the grass or other overgrowth away from the area being edged. The cutting blade is then simply slid to the next adjacent location, and the impact unit raised, and released to extend the cut. This process is continued until the entire edge is formed.

In this manner, the edging tool is self operating, and will produce an edge which is neat and uniform as the cutting blade is moved along its own groove. Furthermore, the tool can be easily held and moved, so even small or weak users can manipulate the tool in an effective manner. Since the tool is so easy to manipulate, the user need not stand or hold the tool in a manner dictated solely by leverage considerations, but can hold the tool in a manner which is comfortable or which is easiest to define the desired edge cut. This makes the tool extremely efficient to use.

Since the tool has only a very few moving parts, its purchase and maintenance is inexpensive and easy. Still further, the minimum number of parts and the self-actuation feature make the tool safe to use, even for young children.

The tool also has systems for controlling the action of the impact element with respect to the blade whereby the tool can be adjusted for various jobs, and the user need not adjust his efforts. The same effort can be used to define a long edge near a walkway as is used to define an intricate edge near a polygonal garden by simply adjusting the control means associated with the impact element.

BRIEF DESCRIPTION OF THE DRAWING FIGURES

FIG. 4 is a view of a vent system used to adjust the operation of the edging tool.

FIG. 5 is a front elevational view of an alternative form of the edging tool with means for guiding and controlling movement of the impact unit of the tool.

DETAILED DESCRIPTION OF THE PREFERRED EMBODIMENT OF THE INVENTION

Figure 1:
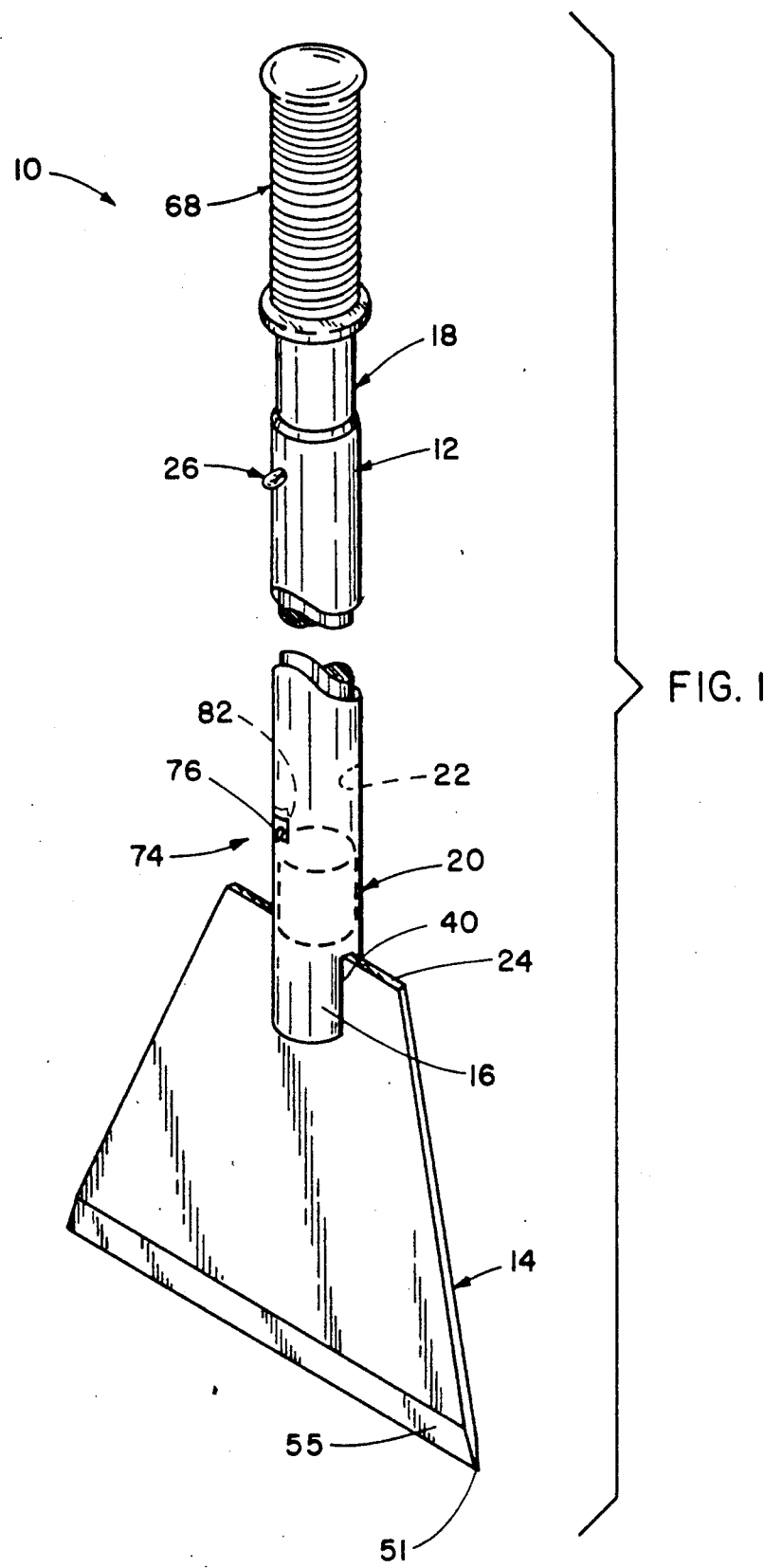
FIG. 1 is a perspective view of the edging tool embodying the present invention.

Shown in FIG. 1 is an edging tool 10 embodying the present invention. The edging tool 10 includes a tubular sleeve unit 12 which is grasped by a user in the manner of a ground tamping device or a shovel, a blade 14 attached to the sleeve unit near a bottom end 16 of that sleeve unit, and an impact unit 18 slidably connected to the sleeve unit to move toward and away from the blade. An impact block 20 is mounted in a bore 22 which extends longitudinally of the sleeve unit to be interposed between the impact unit 12 and the blade upper edge 24. A fastening means attaches the impact unit to the sleeve unit to prevent that impact unit from sliding with respect to the sleeve, and includes a fastener, such as cotter pin 26.

Figure 2:
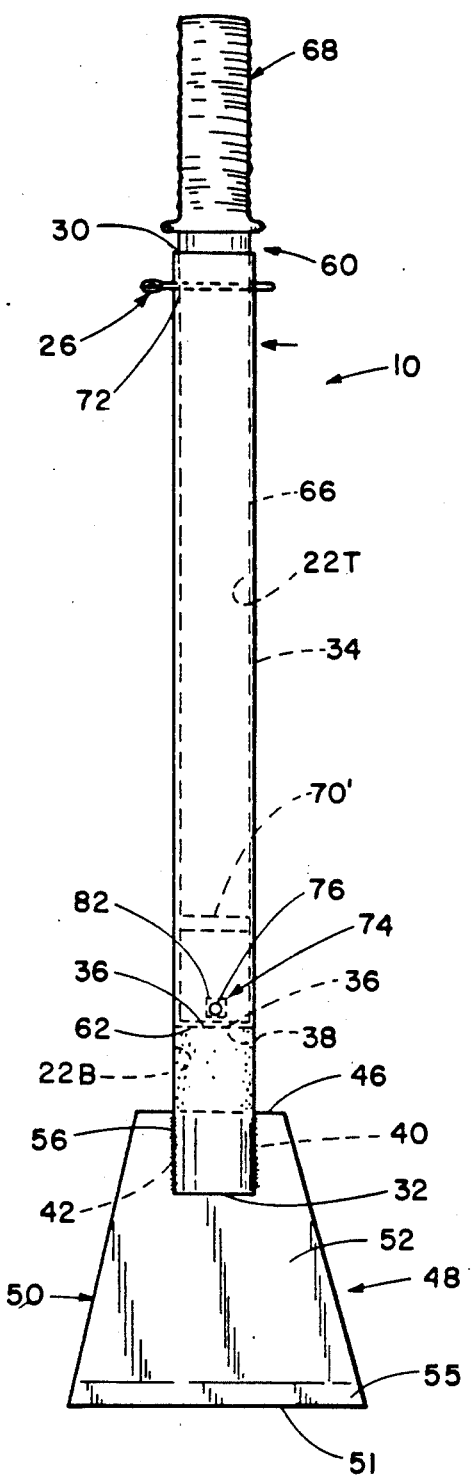
FIG. 2 is a front elevational view of the edging tool in the impact position.
Figure 3:
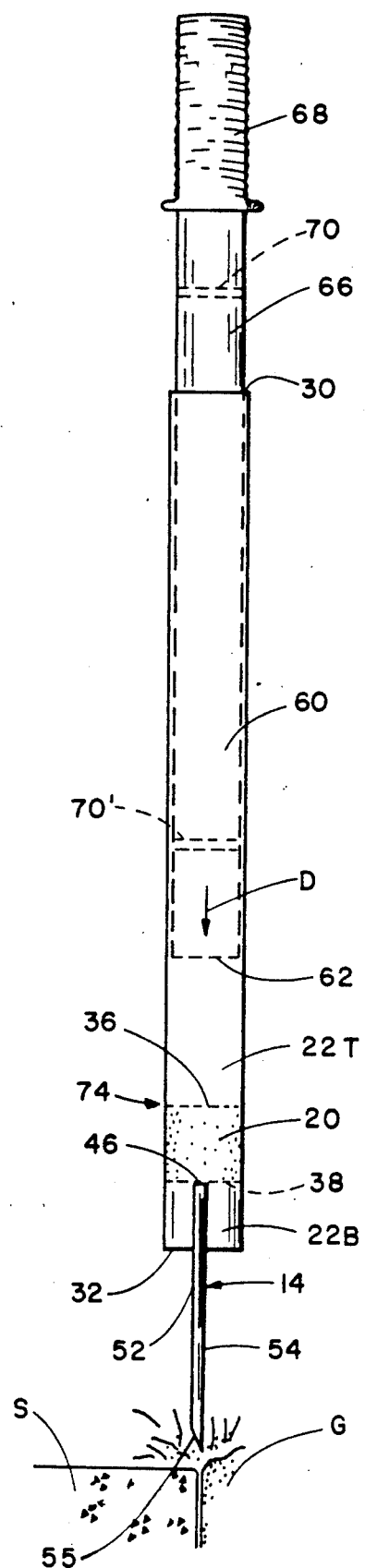
FIG. 3 is a side elevational view of the edging tool in position just prior to having an impact delivered to a cutting blade.

More specifically, referring to FIGS. 2 and 3, the edging tool sleeve unit 18 is seen to include a top end 30, a bottom end 32 and a monolithic cylindrical body 34 connecting the top end to the bottom end. The bore 22 extends longitudinally of and completely through the body 34 from the bottom end to the top end, and the body has an inner diameter which extends across the bore 22. The outer diameter of the cylindrical body is similar to that of a shovel handle, and the sleeve is generally made of high strength steel or like which is easy to maintain.

The impact block 20 is formed of hard steel or the like and is fixedly mounted to the inner surface of the sleeve body at a location spaced from the body bottom end and from the body top end to divide the bore 22 into two chambers, a top chamber 22T located between top surface 36 of the impact block and the sleeve body top end, and a bottom chamber 22B located between bottom surface 38 of the impact block and the sleeve body bottom end. The block is preferably welded to the inner surface of the sleeve body whereby large impacts will not be likely to dislodge that block from the sleeve bore.

The sleeve body further includes two blind-ended slots 40 and 42 which are parallel to each other and to the longitudinal centerline of the sleeve body and which extend from the sleeve body bottom end 32 to adjacent to the bottom surface of the impact block on diametrically opposite sides of the sleeve body. The purpose of the slots 40 and 42 will be understood from the ensuing discussion.

As is also shown in FIG. 2, the edger blade 14 is mounted on the sleeve body at the bottom end of that body. The blade 14 is monolithic and is formed of a tough steel-like material that is common to shovel and spade blades. The blade 14 is trapezoidal in peripheral shape and includes an upper edge 46 which is in abutting contact with the impact block bottom surface, two non-parallel sides edges 48 and 50 extending from opposite ends of the upper edge 46 downwardly toward a cutting edge 51 which extends parallel to the upper edge and connects the side edges together. The blade also includes a front surface 52 and a rear surface 54, with the front surface and the rear surfaces being parallel to each other for the majority of the width of the blade as measured between the upper edge 46 and the cutting edge 51. However, the front surface inclines toward the rear surface near the cutting edge to define a cutting edge relief surface 55. The blade upper edge is wider than the diameter of the sleeve body, and has the sleeve body affixed to the blade front and rear surfaces adjacent to the blind-ended slots, as by welding 56, or the like. The blade thus becomes unitary with the sleeve and the impact block.

The impact unit 18 is also specifically shown in FIG. 2 as including a one-piece, monolithic weight bar 60 having an impact end 62 on one end and a handle end 64 on the other end thereof. A cylindrical body 66 connects the impact end 62 to the handle end 64. The cylindrical body 66 has an outer diameter slightly smaller than the inner diameter of the bore 22 so the weight bar can slide within the bore 22. The weight bar is movable between an impact position, shown in FIG. 2, with the bar impact end 62 contacting the impact block top surface and a cocked position having the bar impact end 62 spaced away from the impact block top surface. The weight bar also includes a hand grip element 68 on the handle end thereof so the bar can be moved from the FIG. 2 impact position to a cocked position.

Operation of the edger tool is apparent from the foregoing description, and can be understood from FIG. 3. The tool cutting edge 51 is positioned adjacent to an element, such as a sidewalk S, at the border of that element and a grassy area G so the cutting edge relief surface 55 is adjacent to the element. The weight bar is lifted into a cocked position, and released. The weight bar slides in the sleeve in the downward direction indicated in FIG. 3 by arrow D, and impacts the impact block and drives the cutting edge into the ground to perform the cutting operation.

In the event that the weight bar is to be locked to the sleeve, as for storage or the like, the edging tool includes a fastening means for locking the weight bar to the sleeve. The fastening means includes a bore 70 defined transversely of the longitudinal axis of the weight bar to extend completely through the weight bar. A corresponding hole 72 is defined through the sleeve body near the top end 30 thereof, and a fastener, such as cotter pin 26 fits through the hole 72 and into the bore 70 to lock the weight bar to the sleeve. When the cotter pin is in position, the edging tool can be stored or moved from one location to another. The fastening means can be used during an edging operation to hold the weight bar in a cocked position while the cutting edge 51 is being moved to a new location. In such a case, the fastening means includes a second bore 70' extending diametrically across the weight bar near the impact end 62 thereof. The weight bar is withdrawn from the sleeve until the second bore 70' is aligned with the hole 72, and the cotter pin 26 is inserted through that hole 72 into the second bore 70' to hold the weight bar in the cocked position. The cotter pin is pulled out of the sleeve to release the weight bar for impact against the impact block to perform the edging operation.

To assist the free movement of the weight bar, a vent system 74 is included in the sleeve unit. The vent system is best shown in FIGS. 1 and 4 as including a vent hole 76 defined through the sleeve body superadjacent to the impact block. Air trapped in the bore top chamber 22T will escape from that chamber via the vent hole so movement of the weight bar will not be impeded by such air.

The movement of the weight bar can be controlled using this vent system by adjusting the size of the vent hole 76. This adjustment is effected using a slide plate 78 having a knob 80 thereon and which is slidably mounted on the sleeve body to cover and uncover the vent hole 76. A slide track 82 is defined in the sleeve body adjacent to the vent hole and the slide plate moves in directions indicated by the double-headed arrow 84 to open and close the vent hole. The amount of air escaping from the chamber 22T and the rate with which it escapes is controlled by the position of the slide plate relative to the vent hole. By adjusting the amount of air released from the chamber 22T during the descent of the impact bar towards the impact block, the amount of impact between the weight and the block can be controlled.

An alternative form of the edging tool is shown in FIG. 5 as edging tool 10'. The tool 10' includes key and keyway means 90 for controlling movement of the weight bar in the sleeve. The means 90 includes two keyway slots 92 and 94 defined in the weight bar to extend longitudinally of that weight bar and on diametrically opposite sides of that bar. Two keys 96 and 98 are mounted on the sleeve inner surface to be slidably received n the keyway slots 92 and 94 respectively. Each keyway slot includes a top end, such as top end 100 of keyway slot 92, and a bottom end, such as bottom end 102 of keyway slot 94, and each key includes a top end, such as top end 103 of key 96, and a bottom end, such as bottom end 104 of key 98. The keyway top ends abut associated key top ends to prevent the weight bar from moving completely out of the sleeve. The co-operation between the keys and the keyways also prevents the weight bar from twisting as it is moving in the sleeve.

To further assist the edging operation, the edging tool 10' includes an impact assisting means 106. The impact assisting means includes a spring, such as compression spring 108, located in each keyway slot to have one end thereof mounted on the keyway slot bottom end 102, and to have a second end connected to a plate, such as plate 110 in keyway slot 92, which is slidably located in that keyway slot. The plate 110 abuts the bottom end of the key in the slot as the weight is moved upwards away from the blade, and compresses the springs in the keyway slots. When the weight bar is released, it moves downwardly towards the impact block, not only under the influence of gravity, but also under the influence of the springs in the keyway slots. The springs thus tend to add initial velocity to the weight bar during the impact step of the operation, thereby increasing the impact force of the weight bar against the impact block. This impact force can be further adjusted by the vent system discussed above whereby the amount of impact force used during a particular edging operation can be adjusted to fit the needs of particular operation. Thus, delicate edging around a small garden can be carried out without the user adjusting his part of the operation to differ from his part in a large edging operation performed about a driveway. The adjusting can be effected using the vent system or the spring system. The spring-loaded initial velocity producing system just discussed can be adjusted to be compressed when the secondary bore 70' is aligned with the hole 76 and when the cotter pin 26 locks the weight bar to the sleeve via such secondary bore 70'.

It is understood that while certain forms of the present invention have been illustrated and described herein, it is not to be limited to the specific forms or arrangements of parts described and shown.

I claim:

1. An edging tool comprising:
   A) a tubular sleeve unit which includes
      (1) a top end, a bottom end, and a cylindrical body connecting said top end to said bottom end, said body having a longitudinal axis and a bore defined longitudinally thereof from said top end to said bottom end, said body having an inner diameter across said bore,
      (2) a monolithic impact block fixedly mounted on said body near said bottom end to close said bore, said impact block having a top surface and a bottom surface, said impact block bottom surface being located adjacent to and spaced from said body bottom end and defining a top chamber in said bore between said impact block top surface and said body top end and a bottom chamber in said bore between said impact block bottom surface and said body bottom end, and
      (3) two blind-ended slots defined in said body from said body bottom end to adjacent to said impact block bottom surface, said slots extending parallel to each other and to the longitudinal axis of said body and being located on diametric opposite sides of said sleeve body;
   B) a monolithic blade fixed to said body and including
      (1) an upper edge in abutting contact with said impact block bottom surface,
      (2) a front surface fixed to said body adjacent to both of said body slots,
      (3) a rear surface fixed to said body adjacent to said slots,
      (4) side edges extending from said upper edge, and
      (5) a cutting edge extending parallel to said upper edge and connecting said side edges together, said cutting edge being beveled to have said front surface incline towards said rear surface adjacent to said cutting edge;
   C) a monolithic impact unit slidably mounted in said sleeve unit and including
      (1) a solid weight bar having an impact end, a handle end, a cylindrical wall connecting said impact end to said handle end, said cylindrical wall having an outer diameter slightly less than said body inner diameter, said impact end being located to contact said impact block top surface and said weight bar moving between a cocked position with said weight bar impact end spaced from said impact block top surface and an impact position with said weight bar impact end in contact with said impact block top surface, and
      (2) a hand grip element on said weight bar handle end;
   D) fastening means on said sleeve unit and on said impact unit for immovably coupling said weight bar to said sleeve body and including
      (1) a bore extending diametrically across said impact unit weight bar near said handle end,
      (2) a hole defined through said sleeve unit body near said sleeve top end, and
      (3) a fastening pin which is sized to be inserted through said sleeve body hole and into said weight bar bore to lock said weight bar to said sleeve unit; and
   E) weight bar control means on said sleeve unit body for controlling movement of said weight bar with respect to said sleeve unit body.

2. The edging tool defined in claim 1 wherein said fastening means includes a second bore extending diametrically across said impact unit weight bar near said impact end.

3. The edging tool defined in claim 2 wherein said weight bar controlling means includes a keyway slot defined in said weight bar and a key fixed to said sleeve unit to slidably fit into said keyway slot.

4. The edging tool defined in claim 3 wherein said weight bar controlling means further includes a spring located in said keyway slot.

5. The edging tool defined in claim 4 wherein said weight bar controlling means further includes a spring plate located in said keyway slot to be engaged by one end of said spring.

6. The edging tool defined in claim 5 wherein said weight bar controlling means further includes a vent system for controlling escape of air from said sleeve unit top chamber.

7. The edging tool defined in claim 6 wherein said weight bar controlling means vent system further includes a hole defined through said sleeve unit body adjacent to said impact block top surface.

8. The edging tool defined in claim 7 wherein said weight bar controlling means vent system further includes a plate slidably mounted on said sleeve unit body to cover and uncover said vent system hole.

* * * * *